(12) United States Patent
Azadet et al.

(10) Patent No.: US 9,128,790 B2
(45) Date of Patent: *Sep. 8, 2015

(54) DIGITAL SIGNAL PROCESSOR HAVING INSTRUCTION SET WITH AN EXPONENTIAL FUNCTION USING REDUCED LOOK-UP TABLE

(75) Inventors: Kameran Azadet, Morganville, NJ (US); Jian-Guo Chen, Basking Ridge, NJ (US); Samer Hijazi, Bethlehem, PA (US); Joseph Williams, Holmdel, NJ (US)

(73) Assignee: Intel Corporation, Santa Clara, CA (US)

( * ) Notice: Subject to any disclaimer, the term of this patent is extended or adjusted under 35 U.S.C. 154(b) by 1118 days.

This patent is subject to a terminal disclaimer.

(21) Appl. No.: 12/362,879

(22) Filed: Jan. 30, 2009

(65) Prior Publication Data

US 2010/0198894 A1     Aug. 5, 2010

(51) Int. Cl.
*G06F 1/035* (2006.01)
*G06F 7/556* (2006.01)

(52) U.S. Cl.
CPC ............... *G06F 7/556* (2013.01); *G06F 1/035* (2013.01); *G06F 2101/10* (2013.01)

(58) Field of Classification Search
USPC .......................... 709/277, 606; 708/277, 606
See application file for complete search history.

(56) References Cited

U.S. PATENT DOCUMENTS

| | | | | | |
|---|---|---|---|---|---|
| 5,926,406 | A | * | 7/1999 | Tucker et al. | 708/606 |
| 5,990,894 | A | * | 11/1999 | Hu et al. | 345/418 |
| 6,018,556 | A | * | 1/2000 | Janesch et al. | 375/376 |
| 6,128,638 | A | * | 10/2000 | Thomas | 708/606 |
| 6,529,922 | B1 | * | 3/2003 | Hoge | 708/204 |
| 6,844,880 | B1 | | 1/2005 | Lindholm et al. | |
| 7,715,656 | B2 | * | 5/2010 | Zhou | 382/298 |
| 7,912,883 | B2 | * | 3/2011 | Hussain | 708/277 |
| 2005/0177605 | A1 | * | 8/2005 | Sudhakar | 708/277 |
| 2007/0112902 | A1 | | 5/2007 | Dance et al. | |
| 2009/0037504 | A1 | * | 2/2009 | Hussain | 708/277 |

* cited by examiner

*Primary Examiner* — Ilwoo Park
(74) *Attorney, Agent, or Firm* — Nicholson De Vos Webster & Elliott LLP

(57) ABSTRACT

A digital signal processor is provided having an instruction set with an exponential function that uses a reduced look-up table. The disclosed digital signal processor evaluates an exponential function for an input value, x, by decomposing the input value, x, to an integer part, N, a first fractional part, $q_1$, larger than a specified value, $x_0$, and a second fractional part, $q_2$, smaller than the specified value, $x_0$; computing $2^{q_2}$ using a polynomial approximation, such as a cubic approximation; obtaining $2^{q_1}$ from a look-up table; and evaluating the exponential function for the input value, x, by multiplying $2^{q_2}$, $2^{q_1}$ and $2^N$ together. Look-up table entries have a fewer number of bits than a number of bits in the input value, x.

24 Claims, 2 Drawing Sheets

DIGITAL SIGNAL PROCESSOR HAVING INSTRUCTION SET WITH AN EXPONENTIAL FUNCTION USING REDUCED LOOK-UP TABLE

CROSS-REFERENCE TO RELATED APPLICATIONS

The present application is related to U.S. patent application Ser. No. 12/324,926, entitled "Digital Signal Processor Having Instruction Set with One or More Non-Linear Complex Functions;" U.S. patent application Ser. No. 12/324,927, entitled "Digital Signal Processor Having Instruction Set With One Or More Non-Linear Functions Using Reduced Look-Up Table;" U.S. patent application Ser. No. 12/324,931, entitled "Digital Signal Processor Having Instruction Set with One or More Non-Linear Functions Using Reduced Look-Up Table with Exponentially Varying Step-Size;" and U.S. patent application Ser. No. 12/324,934, entitled "Digital Signal Processor with One or More Non-Linear Functions Using Factorized Polynomial Interpolation;" each filed Nov. 28, 2008 and incorporated by reference herein.

FIELD OF THE INVENTION

The present invention is related to digital signal processing techniques and, more particularly, to techniques for digital processing of non-linear functions.

BACKGROUND OF THE INVENTION

Digital signal processors (DSPs) are special-purpose processors utilized for digital processing. Signals are often converted from analog form to digital form, manipulated digitally, and then converted back to analog form for further processing. Digital signal processing algorithms typically require a large number of mathematical operations to be performed quickly and efficiently on a set of data.

DSPs thus often incorporate specialized hardware to perform software operations that are often required for math-intensive processing applications, such as addition, multiplication, multiply-accumulate (MAC), and shift-accumulate. A Multiply-Accumulate architecture, for example, recognizes that many common data processing operations involve multiplying two numbers together, adding the resulting value to another value and then accumulating the result. Such basic operations can be efficiently carried out utilizing specialized high-speed multipliers and accumulators.

DSPs, however, generally do not provide specialized instructions to support non-linear mathematical functions, such as exp, log, cos, 1/x and $x^K$. Increasingly, however, there is a need for non-linear arithmetic operations in processors. A nonlinear function is any problem where the variable(s) to be solved for cannot be written as a linear sum of independent components. If supported at all, a DSP supports a non-linear function by using a large look-up table (LUT). An exemplary LUT may store on the order of 2,000 16 bit values, and thus require 32 kilobits of random access memory (RAM). The LUT is typically implemented in a separate dedicated SRAM (so that data and the non-linear LUT can be accessed at the same time to achieve improved performance).

In cases where the DSP is based on VLIW (Very Long Instruction Word) or SIMD (Single Instruction Multiple Data) architectures with N issues slots, the memory size becomes even larger. The LUT must be replicated N times because each issue slot must be able to read different values in the look-up table simultaneously, as the values of the data in each issue slot may be different. This replication of memory results in an even greater silicon area. For example, assuming a LUT in a 4-way vector co-processor, a memory size of 128 Kb is required (32Kb×4). In addition, if different non-linear functions are required for different parts of a program being executed, the various LUTs must be loaded into memory, thereby significantly increasing latency and potentially reducing performance.

A need therefore exists for a digital signal processor having an instruction set that supports an exponential function using a look-up table of reduced size.

SUMMARY OF THE INVENTION

Generally, a digital signal processor is provided having an instruction set with an exponential function that uses a reduced look-up table. According to one aspect of the invention, the disclosed digital signal processor evaluates an exponential function for an input value, x, by decomposing the input value, x, to an integer part, N, a first fractional part, $q_1$, larger than a specified value, $x_0$, and a second fractional part, $q_2$, smaller than the specified value, $x_0$; computing $2^{q_2}$ using a polynomial approximation, such as a cubic approximation; obtaining $2^{q_1}$ from a look-up table; and evaluating the exponential function for the input value, x, by multiplying $2^{q_2}$, $2^{q_1}$ and $2^N$ together.

In one implementation, the multiplying step comprises the step of first multiplying the values $2^{q_2}$ and $2^{q_1}$ together and the multiplication by $2^N$ is performed by shifting a result of the first multiplication by N bits. $2^N$ can optionally be computed using a barrel shifter. Generally, entries in the look-up table have a fewer number of bits than a number of bits in the input value, x.

If the input value, x, has an initial basis, Z, that is not a binary number, the input value, x, can be multiplied by $\log_Z(Y)$ to generate a modified input value, $x_1$, where $\log_Z(Y)$, is obtained from a first look-up table.

A more complete understanding of the present invention, as well as further features and advantages of the present invention, will be obtained by reference to the following detailed description and drawings.

DETAILED DESCRIPTION

The present invention provides a digital signal processor that supports an exponential function using one or more look-up tables of reduced size. Generally, one or more look-up tables store a subset of values for at least a portion of the computation of an exponential function. The present invention recognizes that a Taylor series approximation can be employed to compute an exponential function when the dynamic range of the input value is limited, as discussed further below. As used herein, the term "digital signal processor" shall be a processor that executes instructions in program code. Further, a hard-wired logic implementation of digital signal processing functions is not considered herein. While the present invention is illustrated for computing exponential functions of various exemplary bases (e.g., bases of 2, 10 and e for computing exemplary exponential functions $2^x$, $10^x$ and $e^x$, respectively), the present invention can be applied to any basis value, as would be apparent to a person of ordinary skill in the art. It is further noted that the disclosed exponential function can be applied for values of x that are scalar or vector inputs.

In this manner, the present invention supports exponential functions by using a smaller look-up table than required by conventional techniques. As previously indicated, an exemplary look-up table may store on the order of 2,000 16 bit values, and thus require 32 kilobits of random access memory (RAM). With the present invention, a smaller look-up table can be employed to store a subset of the 2,000 values.

Figure 1:
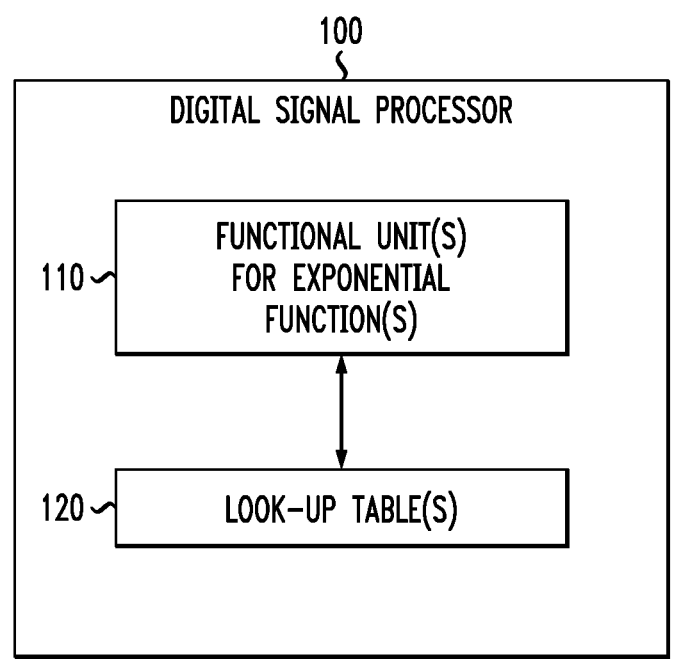
FIG. 1 is a schematic block diagram of an exemplary digital signal processor that incorporates features of the present invention.

FIG. 1 is a schematic block diagram of an exemplary digital signal processor 100 that incorporates features of the present invention. As shown in FIG. 1, the exemplary digital signal processor 100 includes one or more functional units 110 for exponential functions. In addition, the digital signal processor 100 comprises one or more look-up tables 120 that store a subset of values for computing the exponential function.

As discussed hereinafter, in various embodiments, the digital signal processor 100 may use hardware or a look-up table (or a combination thereof) to compute the exponential function. Generally, if the digital signal processor 100 is processing software code that includes a predefined instruction keyword corresponding to an exponential function and any appropriate operands for the function, the instruction decoder must trigger the appropriate exponential functional units 110 that is required to process the instruction. It is noted that an exponential functional unit 110 can be shared by more than one instruction.

Generally, the present invention extends conventional digital signal processors to provide an enhanced instruction set that supports exponential functions using one or more look-up tables. The digital signal processor 100 in accordance with the present invention receives at least one number as an input, applies an exponential function to the input and generates an output value.

The disclosed digital signal processors may have a scalar architecture, as shown in FIG. 1, that processes a single number at a time, or a vector architecture, as discussed hereinafter in conjunction with FIG. 3, that processes one or more numbers simultaneously. In the case of a vector-based digital signal processor implementation, the input number is a vector comprised of a plurality of scalar numbers that are processed in parallel.

Polynomial Approximation of Exponential Functions

The present invention recognizes that an exponential function can be approximated using a Taylor series. Thus, an exponential function, exp(x), can be expressed as:

$$\exp(x) = 1 + x + \frac{x^2}{2!} + \frac{x^3}{3!} + \ldots \quad (1)$$

In addition, the present invention recognizes that a cubic approximation (i.e., including up to $x^3$ in the Taylor series) is suitable for values of x such that $0 < x < x_0$, where $x_0$ is a sufficiently small value for a desired accuracy of the value of exp(x). For example, for a desired error bound of $10^{-5}$, it can be shown that $x_0$ may have a value of ⅛. It is noted that the Taylor series can be centered around zero for an exponential function, as the exponential function is singular at an input value of zero. As discussed hereinafter, the present invention employs a scaling technique to reduce the input values for the exponential function to a small range, and then applies the Taylor series approximation within the smaller range.

It is noted that $2^x$ can be expressed as a function of exp(x), using the following identity:

$$2^x = e^{x \cdot \log(2)} \quad (2)$$

Again, using a Taylor series approximation for the exponential function, $2^x$ can be written as follows:

$$2^x = 1 + \frac{\log(2)}{1!} \cdot x + \frac{\log^2(2)}{2!} \cdot x^2 + \frac{\log^3(2)}{3!} \cdot x^3 + \ldots \quad (3)$$

for $0 \le x \le x_0$.

As indicated above, the present invention employs a scaling technique to reduce the input values for the exponential function to a small range, and then applies the Taylor series approximation within the smaller range. Thus, the input value, x, can be decomposed as an integer part, N, a first fractional part larger than $x_0$, $q_1$, and a second fractional part smaller than $x_0$, $q_2$:

$$x = N + q_1 + q_2 \quad (4)$$

Thus, $2^x$ can be written as follows:

$$2^x = 2^{N+q_1+q_2} \quad (5)$$

$$2^x = 2^N \cdot 2^{q_1} \cdot 2^{q_2} \quad (6)$$

The present invention recognizes that the three components, N, $q_1$, $q^2$, of the input value, x, can either be easily computed in hardware or accessed from a small look-up table. As used herein, a "small" look-up table shall indicate that the number of bits of each entry in the look-up table is significantly smaller than the number of bits in the input value, x. In particular, N is an integer and hence $2^N$ can be implemented, for example, using a barrel shifter. The first fractional part, $q_1$, can be coded with very small number of bits. For example, for $x_0$ equal to an exemplary value of ⅛, $q_1$ can be coded with three bits. Thus, all combinations of $2^{q_1}$ can be computed using a small look-up table, such as a read-only memory having 8 entries. Finally, the second fractional part, $q^2$, has values between 0 and $x_0$ and hence $2^{q_2}$ can be computed using the cubic approximation described above in conjunction with equation (1).

The present invention recognizes that the exponential computation of equation (6) can be generalized to any basis other than two. Typically, other valuable basis values comprise e and 10. Thus, for many applications, the present invention can compute an exponential function for bases of 2, 10 and e (e.g., for computing exemplary exponential functions $2^x$, $10^x$ and $e^x$, respectively).

To compute $Y^x$, the following identity is employed:

$$Y^x = 2^{x \cdot \log_2(Y)} \quad (7)$$

As discussed further below in conjunction with FIG. 2, the first term, $2^x$, can be computed using the above-described decomposition of x, and the second term, $\log_2(Y)$, can be obtained from a small look-up table (since, for most applications, only values of Y equal to 2, 10 or e, are required, e.g., $\log_2(2)$, $\log_2(10)$ and $\log_2(e)$).

Figure 2:
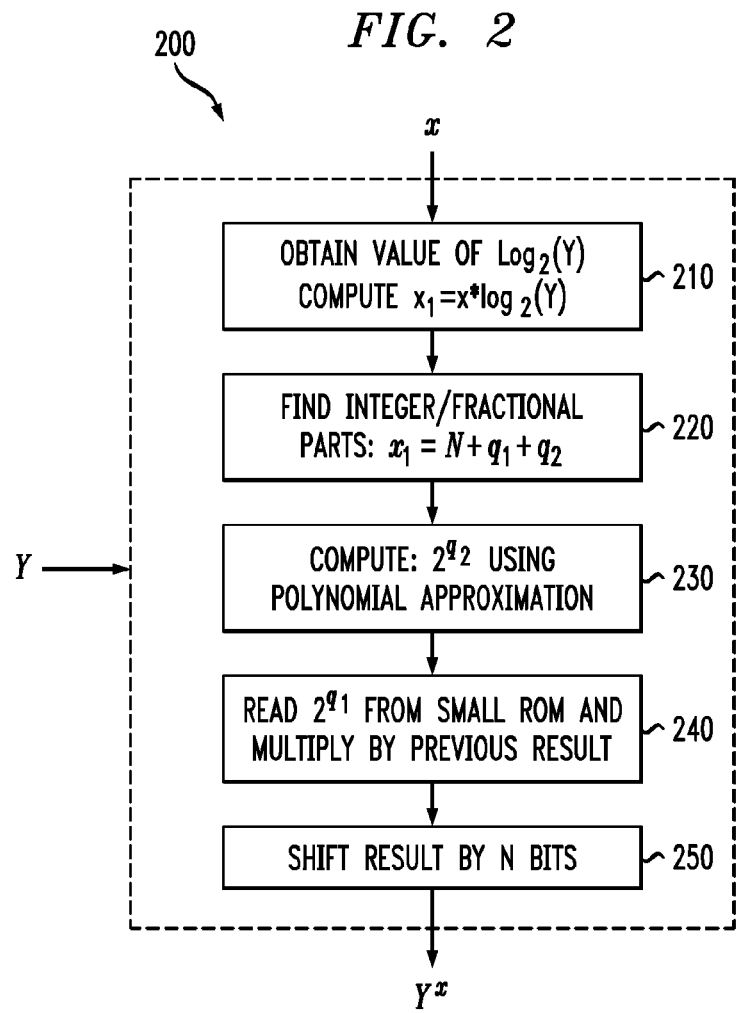
FIG. 2 is a flow chart describing an exemplary implementation of an exponential function computation process that incorporates features of the present invention.

FIG. 2 is a flow chart describing an exemplary implementation of an exponential function computation process 200 that incorporates features of the present invention. As shown in FIG. 2, the exponential function computation process 200 initially obtains a value of $\log_2(Y)$ from a look-up table, for the indicated basis value, Y, during step 210. In addition, the exponential function computation process 200 begins computing the superscript of equation (7) by computing a superscript value, $x_1$, as follows:

$$x_1 = x * \log_2(Y)$$

where x is the given input value and $\log_2(Y)$ is obtained from a look-up table. It is noted that the exemplary implementation of the exponential function computation process 200 assumes an initial basis of two for the input value (i.e., a binary input value). The exponential function computation process 200 could be implemented, however, for any initial basis, Z, by multiplying the input value, x, by $\log_Z(Y)$ and making some additional changes noted below, as would be apparent to a person of ordinary skill in the art.

During step 220, the above-described decomposition of equation (4) into integer and fractional parts is performed, where:

$$x_1 = N + q_1 + q_2$$

During step 230, the second fractional part, $2^{q_2}$, for equation (6) is computed using a polynomial approximation. During step 240, the first fractional part, $2^{q_1}$, for equation (6) is obtained from a small look-up table and the first fractional part, $2^{q_1}$, is multiplied by the second fractional part, $2^{q_2}$, from step 230.

The final portion of equation (6) (multiplying by $2^N$), is performed during step 250 by shifting the result of step 240 by N bits to provide $2^{x_1}$. According to equation (7), $Y^x$ equals $2^{x_1}$.

It is noted that if the input value, x, has an initial basis, Z, that is not equal to two (i.e., the input value is not a binary number), then steps 230 and 240 would employ $Z^{q_2}$ and $Z^{q_1}$, respectively, and step 250 would multiply the result of step 240 by $Z^N$. For example, if Y is equal to e and the input value, x, has an initial basis, Z, equal to 10, then $e^x$ is obtained by multiplying the input value x by $\log_{10}(Y)$ during step 210 and then multiplying $10^N$, $10^{q_2}$ and $10^{q_1}$ together during steps 240 and 250.

Figure 3:
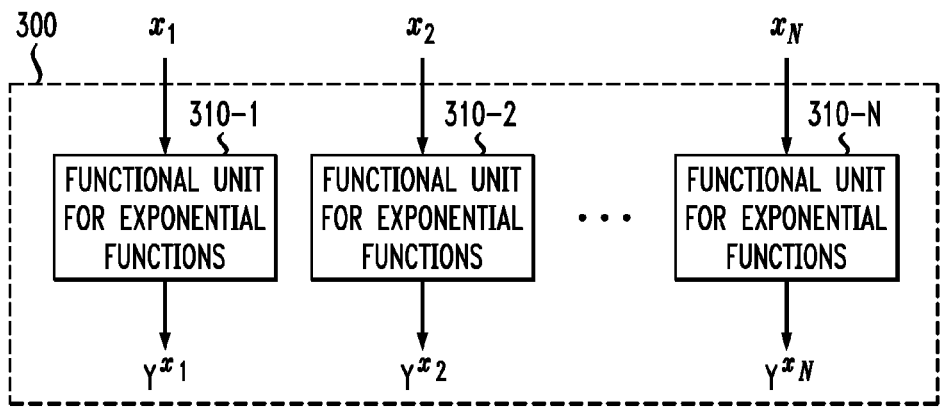
FIG. 3 is a schematic block diagram of an exemplary vector-based digital signal processor that processes one or more numbers simultaneously in accordance with an embodiment of the present invention.

FIG. 3 is a schematic block diagram of an exemplary vector-based digital signal processor 300 that processes one or more numbers simultaneously in accordance with an embodiment of the present invention. Generally, the vector-based implementation of FIG. 3 increases the number of MIPS (instructions per second), relative to the scalar implementation of FIG. 1, by performing different processes concurrently. Thus, the vector-based digital signal processor 300 contains plural functional units for exponential functions 310-1 through 310-N. For example, a dual digital signal processor 300 contains two functional units 310-1 and 310-2 that are capable of performing two independent non-linear function operations concurrently.

As noted above, the input to the vector-based digital signal processor 300 is a vector, X, comprised of a plurality of scalar numbers, $x_n$, that are processed in parallel. For example, assume a vector-based digital signal processor 300 supports an exponential function for a vector, X, where X is comprised of scalar numbers $x_1$ through $x_4$. The exemplary exponential function may be expressed as follows:

$$\text{Exp\_vec4}(x_1, x_2, x_3, x_4, \text{type}),$$

where type typically equals "2," "10" or "e."

Conclusion

While exemplary embodiments of the present invention have been described with respect to digital logic blocks and memory tables within a digital signal processor, as would be apparent to one skilled in the art, various functions may be implemented in the digital domain as processing steps in a software program, in hardware by circuit elements or state machines, or in combination of both software and hardware. Such software may be employed in, for example, a digital signal processor, application specific integrated circuit or micro-controller. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, wherein, when the program code is loaded into and executed by a machine, such as a processor, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

It is to be understood that the embodiments and variations shown and described herein are merely illustrative of the principles of this invention and that various modifications may be implemented by those skilled in the art without departing from the scope and spirit of the invention.

We claim:

1. A method performed by a vector-based digital signal processor for evaluating a non-linear exponential function for an input vector, x, said method comprising:

obtaining one or more software instructions;

in response to a predefined software instruction keyword for said non-linear exponential function, invoking at least one hardware functional unit that implements said non-linear exponential function to perform the following steps for each component of said input vector, x, to produce a corresponding component of an output vector in hardware, wherein said input vector, x, comprises a plurality of numbers and wherein said vector-based digital signal processor processes said plurality of numbers substantially simultaneously:

decomposing each component of said input vector, x, to an integer part, N, a first fractional part, $q_1$, larger than a specified value, $x_0$, and a second fractional part, $q_2$, smaller than said specified value, $x_0$;

computing $2^{q_2}$ using a polynomial approximation;

obtaining $2^{q_1}$ from a look-up table in a random access memory (RAM) of said vector-based digital signal processor; and evaluating said exponential function for said input vector, x, by multiplying $2^{q_2}$, and $2^{q_1}$ together and performing a shift by N, wherein said predefined software instruction keyword for said non-linear exponential function is part of an instruction set of said vector-based digital signal processor.

2. The method of claim 1, wherein said multiplying step comprises the step of first multiplying said values $2^{q_2}$ and $2^{q_1}$ together and said multiplication by $2^N$ is performed by shifting a result of said first multiplication by N bits.

3. The method of claim 1, wherein said polynomial approximation is a cubic approximation.

4. The method of claim 1, wherein $2^N$ is computed using a barrel shifter.

5. The method of claim 1, wherein said vector-based digital signal processor executes software instructions from program code.

6. The method of claim 1, wherein entries in said look-up table have a fewer number of bits than a number of bits in said input vector, x.

7. The method of claim 1, wherein said polynomial approximation is a Taylor Series.

8. A vector-based digital signal processor that evaluates a non-linear exponential function for an input vector, x, comprising:
  a memory storing at least one look-up table; and
  at least one processor, coupled to the memory, operative to:
  obtain one or more software instructions;
  in response to a predefined software instruction keyword for said non-linear exponential function, invoke at least one hardware functional unit that implements said non-linear exponential function to perform the following steps for each component of said input vector, x, to produce a corresponding component of an output vector in hardware, wherein said input vector, x, comprises a plurality of numbers and wherein said vector-based digital signal processor processes said plurality of numbers substantially simultaneously:
  decompose each component of said input vector, x, to an integer part, N, a first fractional part, $q_1$, larger than a specified value, $x_0$, and a second fractional part, $q_2$, smaller than said specified value, $x_0$;
  compute $2^{q_2}$ using a polynomial approximation;
  obtain $2^{q_1}$ from at least one of said look-up tables in a random access memory (RAM) of said vector-based digital signal processor; and
  evaluate said exponential function for said input vector, x, by multiplying $2^{q_2}$, and $2^{q_1}$ together and performing a shift by N, wherein said predefined software instruction keyword for said non-linear exponential function is part of an instruction set of said vector-based digital signal processor.

9. The vector-based digital signal processor of claim 8, wherein said multiplying step comprises the step of first multiplying said values $2^{q_2}$ and $2^{q_1}$ together and said multiplication by $2^N$ is performed by shifting a result of said first multiplication by N bits.

10. The vector-based digital signal processor of claim 8, wherein said polynomial approximation is a cubic approximation.

11. The vector-based digital signal processor of claim 8, wherein $2^N$ is computed using a barrel shifter.

12. The vector-based digital signal processor of claim 8, wherein said digital signal processor executes software instructions from program code.

13. The vector-based digital signal processor of claim 8, wherein entries in said first and second look-up tables have a fewer number of bits than a number of bits in said input vector, x.

14. The vector-based digital signal processor of claim 8, wherein said polynomial approximation is a Taylor Series.

15. An integrated circuit, comprising:
  a vector-based digital signal processor that evaluates a non-linear exponential function for an input vector, x, comprising:
  a memory storing at least one look-up table; and
  at least one processor, coupled to the memory, operative to:
  obtain one or more software instructions;
  in response to a predefined software instruction keyword for said non-linear exponential function, invoke at least one hardware functional unit that implements said non-linear exponential function to perform the following steps for each component of said input vector, x, to produce a corresponding component of an output vector in hardware, wherein said input vector, x, comprises a plurality of numbers and wherein said vector-based digital signal processor processes said plurality of numbers substantially simultaneously:
  decompose each component of said input vector, x, to an integer part, N, a first fractional part, $q_1$, larger than a specified value, $x_0$, and a second fractional part, $q_2$, smaller than said specified value, $x_0$;
  compute $2^{q_2}$ using a polynomial approximation;
  obtain $2^{q_1}$ from at least one of said look-up tables in a random access memory (RAM) of said vector-based digital signal processor; and
  evaluate said exponential function for said input vector, x, by multiplying $2^{q_2}$, and $2^{q_1}$ together and performing a shift by N, wherein said predefined software instruction keyword for said non-linear exponential function is part of an instruction set of said vector-based digital signal processor.

16. The integrated circuit of claim 15, wherein said multiplying step comprises the step of first multiplying said values $2^{q_2}$ and $2^{q_1}$ together and said multiplication by $2^N$ is performed by shifting a result of said first multiplication by N bits.

17. The integrated circuit of claim 15, wherein said polynomial approximation is a cubic approximation.

18. The integrated circuit of claim 15, wherein $2^N$ is computed using a barrel shifter.

19. The integrated circuit of claim 15, wherein said vector-based digital signal processor executes software instructions from program code.

20. The integrated circuit of claim 15, wherein entries in said first and second look-up tables have a fewer number of bits than a number of bits in said input vector, x.

21. The integrated circuit of claim 15, wherein said polynomial approximation is a Taylor Series.

22. A method performed by a vector-based digital signal processor for evaluating a non-linear exponential function for an input vector, x, having an initial basis, Z, said method comprising:
  obtaining one or more software instructions;
  in response to a predefined software instruction keyword for said non-linear exponential function, invoking at least one hardware functional unit that implements said non-linear exponential function to perform the following steps for each component of said input vector, x, to produce a corresponding component of an output vector in hardware, wherein said input vector, x, comprises a plurality of numbers and wherein said vector-based digital signal processor processes said plurality of numbers substantially simultaneously:
  multiplying each component of said input vector, x, having said initial basis, Z, by logz(Y) to generate a modified input vector, $x_1$, where $\log_Z(Y)$, is obtained from a first look-up table in a random access memory (RAM) of said vector-based digital signal processor;
  decomposing each component of said modified input vector, $x_1$, to an integer part, N, a first fractional part, $q_1$, larger than a specified value, $x_0$, and a second fractional part, $q_2$, smaller than said specified value, $x_0$;
  computing $Z^{q_2}$ using a polynomial approximation;
  obtaining $Z^{q_1}$ from a second look-up table in said random access memory (RAM) of said vector-based digital signal processor; and
  evaluating said exponential function for said input vector, x, by multiplying $Z^{q_2}$, and $Z^{q_1}$ together and performing a shift by N, wherein said predefined software instruction keyword for said non-linear exponential function is part of an instruction set of said vector-based digital signal processor.

23. The method of claim 22, wherein said polynomial approximation is a cubic approximation.

24. The method of claim 22, wherein said polynomial approximation is a Taylor Series.

* * * * *